(12) United States Patent
Orthmann

(10) Patent No.: US 9,321,552 B2
(45) Date of Patent: Apr. 26, 2016

(54) MAGNETICALLY SEALABLE COVER

(71) Applicant: Christopher Bradley Orthmann, Cape Coral, FL (US)

(72) Inventor: Christopher Bradley Orthmann, Cape Coral, FL (US)

(*) Notice: Subject to any disclaimer, the term of this patent is extended or adjusted under 35 U.S.C. 154(b) by 0 days.

(21) Appl. No.: 14/637,015

(22) Filed: Mar. 3, 2015

(65) Prior Publication Data

US 2015/0251824 A1 Sep. 10, 2015

Related U.S. Application Data

(60) Provisional application No. 61/947,981, filed on Mar. 4, 2014.

(51) Int. Cl.
| | |
|---|---|
| *B65D 5/18* | (2006.01) |
| *B65D 5/42* | (2006.01) |
| *B65D 5/64* | (2006.01) |
| *B65D 51/06* | (2006.01) |

(52) U.S. Cl.
CPC ............. *B65D 5/18* (2013.01); *B65D 5/4283* (2013.01); *B65D 5/643* (2013.01); *B65D 51/06* (2013.01); *B65D 2313/04* (2013.01); *Y02W 30/807* (2015.05)

(58) Field of Classification Search
CPC ........ B65D 51/00; B65D 51/06; B65D 51/02; B65D 5/4283; B65D 5/643; B65D 5/18
USPC ............ 220/230, 62, 62.1; 162/138; 428/611, 428/928; 206/818; 229/103, 198, 190, 229/198.3
See application file for complete search history.

(56) References Cited

U.S. PATENT DOCUMENTS

| | | | | |
|---|---|---|---|---|
| 1,299,503 A | * | 4/1919 | Pente | B65D 5/2028 229/115 |
| 2,308,003 A | * | 1/1943 | Gamrod | A45C 11/38 224/908 |
| 2,959,832 A | | 11/1960 | Baermann | |
| 3,237,973 A | | 3/1966 | Rumberger | |
| 3,770,908 A | * | 11/1973 | Craggs | G11B 3/5827 229/198 |
| 4,234,378 A | | 11/1980 | Iwasaki et al. | |
| 4,249,267 A | | 2/1981 | Voss | |
| 4,331,285 A | * | 5/1982 | Gottwals | H05K 9/0007 174/380 |
| 4,826,059 A | * | 5/1989 | Bosch | A45C 11/24 206/350 |
| 4,949,845 A | * | 8/1990 | Dixon | B65D 5/4208 206/806 |
| 5,924,624 A | * | 7/1999 | Martin | B42D 15/0053 229/71 |
| 6,267,277 B1 | * | 7/2001 | Taylor | A45C 7/0095 206/350 |
| 7,481,355 B2 | * | 1/2009 | Hui | B65D 5/241 229/117.08 |
| 7,686,206 B2 | * | 3/2010 | Bondarik | B65D 5/36 229/117.08 |

(Continued)

FOREIGN PATENT DOCUMENTS

FR 2649671 A1 * 1/1991 ............... B31B 1/62

OTHER PUBLICATIONS

Unknown Author, Magnetic Wrapping Paper, Jul. 15, 2005, https://www.flickr.com/photos/mothdesign/292831496/in/album-72157594367375774/.

*Primary Examiner* — Robert J Hicks
(74) *Attorney, Agent, or Firm* — George F. Wallace

(57) ABSTRACT

A magnetically sealable cover forms a hollow container having a cube or parallelogram shape. The cover includes a planar main body and six flaps. The main body has top, bottom, left, and right edges respectively forming a right angle. Each edge has a flap connected thereto, except the right and left edges each have two flaps connected thereto. The main body can be bent such that pairs of flaps magnetically engage.

10 Claims, 3 Drawing Sheets

(56) References Cited

U.S. PATENT DOCUMENTS

| | | | |
|---|---|---|---|
| 2005/0218202 A1* | 10/2005 | Braoudakis | B65D 5/22 229/178 |
| 2006/0191983 A1* | 8/2006 | Cargile, Jr. | B65D 5/743 229/103 |
| 2008/0099543 A1* | 5/2008 | Bondarik | B65D 5/36 229/117.08 |
| 2008/0237077 A1* | 10/2008 | Sage | B42F 7/08 206/425 |
| 2010/0181311 A1* | 7/2010 | Costecalde | B65D 5/2052 220/7 |
| 2010/0224644 A1* | 9/2010 | Aldridge | B65D 5/16 220/810 |
| 2010/0237141 A1* | 9/2010 | Foroni | B65D 5/02 229/126 |
| 2014/0084046 A1* | 3/2014 | Colon | B65D 5/0005 229/101.2 |
| 2014/0103100 A1* | 4/2014 | Falcon | B65D 5/4204 229/103.2 |
| 2014/0305999 A1* | 10/2014 | Smith | B65D 71/36 229/109 |

* cited by examiner

MAGNETICALLY SEALABLE COVER

RELATED DOCUMENT

This document is related to, incorporates by reference in its entirety, and claims the priority benefit of U.S. Provision Patent Application No. 61/947,981 entitled "MAGNETIC WRAPPING APPARATUS," and filed on Mar. 4, 2014 by Christopher Bradley Orthmann.

BACKGROUND OF THE INVENTION

Items, such as gifts, can be wrapped with paper products or enclosed within rigid boxes. After such items are wrapped or enclosed, the paper products or boxes can be sealed with adhesive materials, such as glue or adhesive tape.

SUMMARY OF THE INVENTION

It is, therefore, an object of the present invention to provide a magnetically sealable cover configured to form a hollow container having one of a cube and a parallelogram shape.

The present invention can be embodied in a cover 100 having a planar main body 110 and a plurality of flaps.

In an exemplary aspect of the invention, a planar main body 110 can include top 111, bottom 112, left 113, and right 114 edges collectively forming four right angles $A_1$-$A_4$, a main body length $L_{MB}$, and a main body width $W_{MB}$.

In another exemplary aspect of the invention, a first flap 120 can be connected to the top edge 111, and can have a first flap width $W_{1F}$ and a first magnetic portion 121, with the first flap width being equal to the main body width.

In yet another exemplary aspect of the invention, a second flap 130 can be connected to the bottom edge 112, and can have a second flap width $W_{2F}$ and one of a second magnetic portion and a second ferromagnetic portion 131, with the second flap width being equal to the main body width.

In a further exemplary aspect of the invention, a third flap 140 can be connected to the left edge 113, and can have a third magnetic portion 141 and a third flap length $L_{3F}$ less than the main body length.

In still another exemplary aspect of the invention, a fourth flap 150 can be also be connected to the left edge 113, and can have one of a fourth magnetic portion and a fourth ferromagnetic portion 151, and a fourth flap length $L_{4F}$.

In still yet another exemplary aspect of the invention, a fifth flap 160 can be connected to the right edge 114, and can have a fifth magnetic portion 161 and a fifth flap length $L_{5F}$ less than the main body length.

In still yet a further exemplary aspect of the invention, a sixth flap 170 can also be connected to the right edge 114, and can have one of a sixth magnetic portion and a sixth ferromagnetic portion 171, and a sixth flap length $L_{6F}$.

In another exemplary aspect of the invention, the main body can be bent along first and second parallel lines 115, 116, the first and second flaps 120, 130 can respectively bend along top and bottom edges 111, 112, overlap, and magnetically engage, the third and fourth flaps 140, 150 can respectively bend along left edge 113, overlap, and magnetically engage, and the fifth and sixth flaps 160, 170 can respectively bend along right edge 114, overlap, and magnetically engage, so as to form the hollow container.

The follow are additional exemplary aspects of the present invention:
the third and fourth flaps can be spaced apart to define a gap G therebetween;
the fifth and sixth flaps can be spaced apart to define a space S therebetween;
the first and second parallel lines can have respective line lengths equal to the main body width;
at least one of the first, second, third, fourth, fifth, and sixth flaps can have a square shape;
at least one of the first, second, third, fourth, fifth, and sixth flaps can have a rectangular shape; and
when the hollow container is formed, the first flap can be planar along a first plane and the second flap can be planar along a second plane parallel to the first plane; the third flap can be planar along a third plane and the fourth flap can be planar along a fourth plane parallel to the third plane; and/or the fifth flap can be planar along a fifth plane and the sixth flap can be planar along a sixth plane parallel to the fifth plane.

DETAILED DESCRIPTION

It is an object of the present invention to provide a magnetically sealable cover configured to form a hollow container having one of a cube and a parallelogram shape, such a cover having a plurality of embodiments, which are described, and are to be broadly interpreted, via the disclosure herein.

It should be noted that this disclosure includes a plurality of elements and/or aspects, and such elements and/or aspects need not necessarily be interpreted as being conjunctively required by one or more embodiments of the present invention. Rather, all combinations of the one or more elements and/or aspects can enable a separate embodiment of the present invention, which may be claimed with particularity in one or more future filed Non-Provisional Patent Applications. Moreover, any particular materials, structures, and/or sizes disclosed herein, whether expressly or implicity, are to be construed strictly as illustrative and enabling, and not necessarily limiting. Therefore, it is expressly set forth that such materials, structures, and/or sizes independently or in any combination of one of more thereof, are merely illustratively representative of one or more embodiments of the present invention and are not to be construed as necessary in a strict sense.

Further, to the extent the same element or limitation is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

The present invention provides a magnetically sealable cover configured to form a hollow container having one of a cube and a parallelogram shape, which can be used to conveniently cover an item, such as a Christmas Present, for example and not in limitation. One of plural advantages of the present invention is that such a cover can be reusable, which can obviate the wasteful utilization of paper-based coverings that can be torn, ripped, or otherwise damaged during removal.

Figure 1:
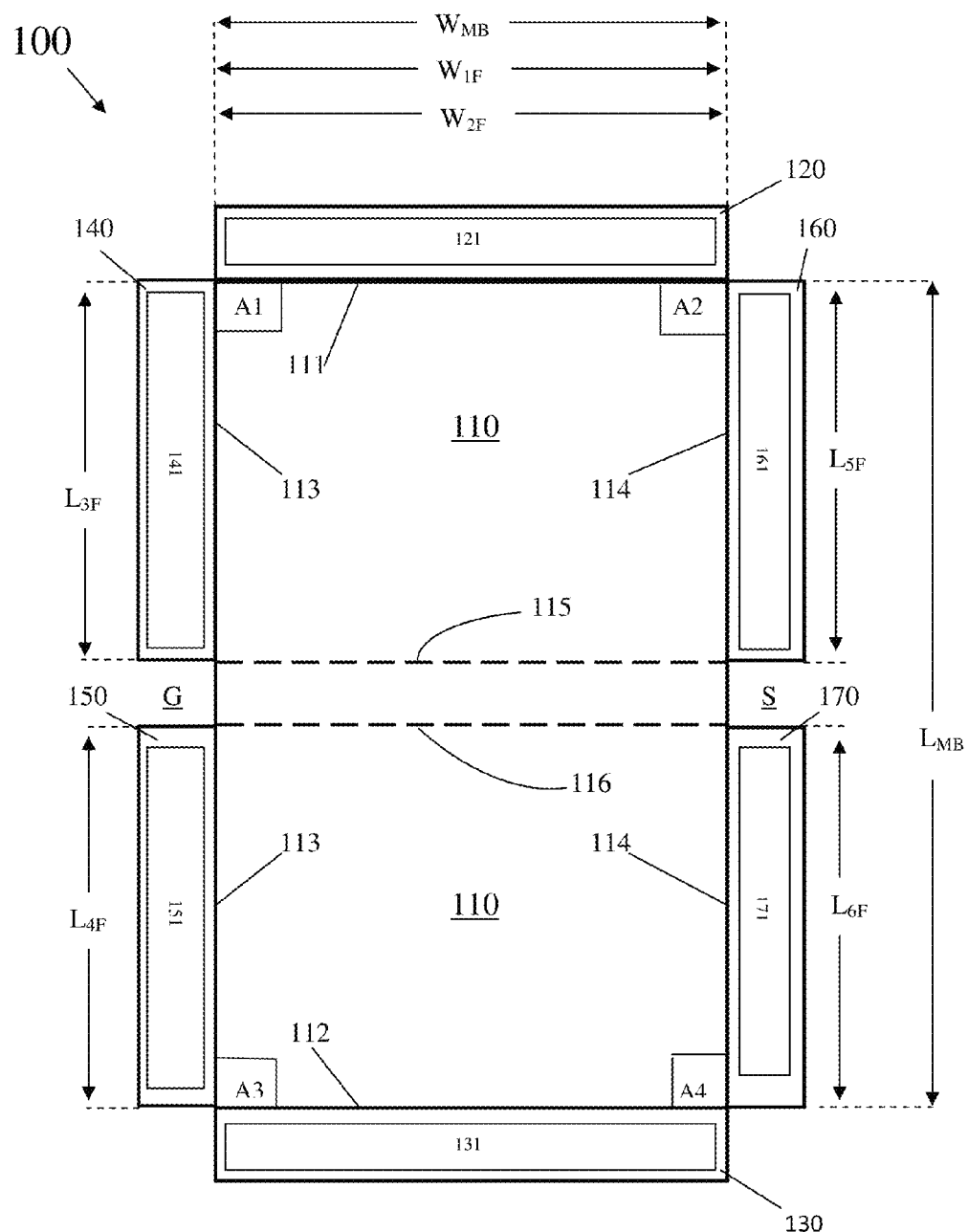
FIG. 1 illustrates an exemplary cover according to the present invention.

FIG. 1 illustrates an exemplary embodiment of the present invention, in which a magnetically sealable cover 100 can have a planar main body 110 and a plurality of flaps.

In an exemplary aspect of the invention, planar main body 110 can include top 111, bottom 112, left 113, and right 114 edges collectively forming right angles $A_1$-$A_4$, a main body length $L_{MB}$, and a main body width $W_{MB}$. According to the present invention, cover 110, and any other element of the present invention, can be formed from any one or more desired materials, such as a paper, polyester (such as, for example and not in limitation, MYLAR®), fabric, plastic, rubber, wood, metal, or any other man-made or naturally-occurring material, and can be rigid or flexible, insofar as the same is functionally compatible with the present invention. Further, main body 110 can be provided in any desired shape, such as a square, rectangle, or any other geometric shape, including any irregular shape, insofar as the shape is functionally consistent with the present invention as described. Notably, the present invention can be initially provided in a rolled, flat, or in a folded configuration.

As further illustrated in FIG. 1, first flap 120 can be connected to top edge 111, and can have a first flap width $W_{1F}$ and a first magnetic portion 121, with the first flap width being equal to main body width $W_{MB}$; and second flap 130 can be connected to bottom edge 112, and can have a second flap width $W_{2F}$ and one of a second magnetic portion and a second ferromagnetic portion 131, with the second flap width as being equal to the main body width.

In a further exemplary aspect of the invention, a third flap 140 can be connected to left edge 113, and can have a third magnetic portion 141 and a third flap length $L_{3F}$ less than the main body length; and a fourth flap 150 can be also be connected to the left edge 113, and can have one of a fourth magnetic portion and a fourth ferromagnetic portion 151. As also illustrated in FIG. 1, optionally, third and fourth flaps 140, 150 can be spaced apart to define a gap G therebetween.

In still yet another exemplary aspect of the invention, a fifth flap 160 can be connected to the right edge 114, and can have a fifth magnetic portion 161 and a fifth flap length $L_{5F}$ less than the main body length; and a sixth flap 170 can also be connected to the right edge 114, and can have one of a sixth magnetic portion and a sixth ferromagnetic portion 171. As additionally illustrated in FIG. 1, optionally, fifth and sixth flaps 140, 150 can be spaced apart to define a space S therebetween.

Notably, any flap herein can be provided with any desired size that is functionally compatible with the present invention. For example, two associated flaps can have sufficient sizes and/or shapes such that they overlap at least in part, such that their respective magnetic engagement portions can engage, and their combined sizes and/or shapes collectively form a complete container side.

In another exemplary aspect of the invention, in forming a hollow container 200 (illustrated in FIG. 2), main body 110 can be bent along first and second parallel lines 115, 116; first and second flaps 120, 130 can be respectively bent along top and bottom edges 111, 112, overlap, and magnetically engage; third and fourth flaps 140, 150 can be respectively bent along left edge 113, overlap, and magnetically engage; and fifth and sixth flaps 160, 170 can be respectively bent along right edge 114, overlap, and magnetically engage.

In another exemplary aspect of the present invention, magnetic and ferromagnetic portions can be provided in any desired size and shape to the extent functionally compatible with the present invention, and therefore, are expressly not limited to the examples illustrated herein. For example, a magnetic portion or a ferromagnetic portion can be provided with a planar shape and accordingly sized to provide a sufficient magnetic engagement with another portion. Notably, the present invention contemplates the utilization of any magnetic and/or ferromagnetic material, including a metallic or even a non-metallic material, such as a plastic magnet (e.g., PANiCNQ, which is a combination of emeraldine-based polyaniline (PANi) and tetracyanoquinodimethane (TCNQ)), for example and not in limitation. Any size and/or shape requirements, including respective positioning, of a magnetic or ferromagnetic portion will be apparent to one of ordinary skill given the magnetic strength of a particular material utilized and the desired magnetic engagement. Further, a magnetic or ferromagnetic portion can be provided in a planar configuration and attached to a top or bottom of a flap, or otherwise combined with a flap. For example, such a portion can be glued to a flap, surrounded by a flap, or integral therewith (e.g. intertwined, molded therewith, etc.), for example and not in limitation.

In a further exemplary aspect of the present invention, lines and edges provided can optionally be scored or marked (such as, via an ink for example) to facilitate their respective bending.

Figure 2:
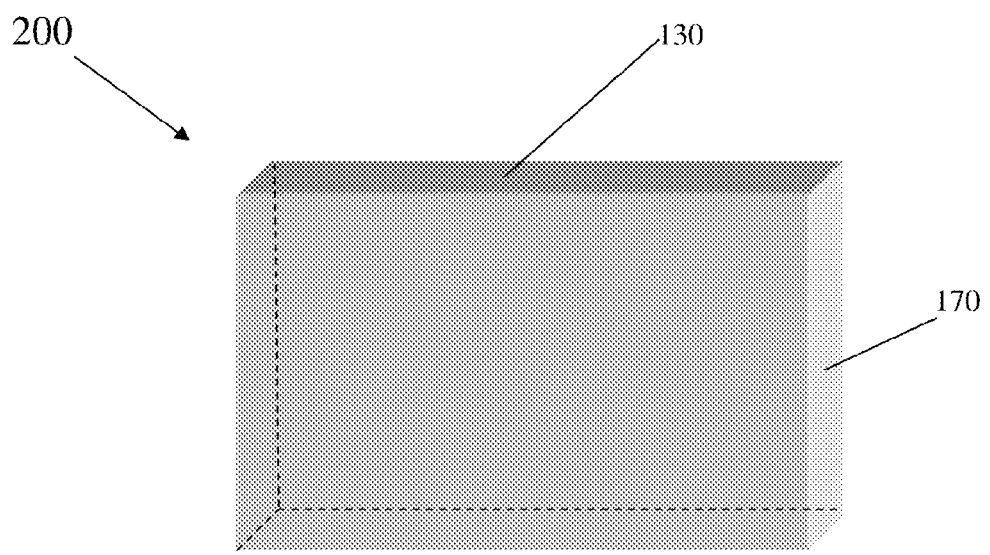
FIG. 2 illustrates an exemplary formed container according to the present invention.

FIG. 2 illustrates an exemplary container 200 having respective flaps overlapped and magnetically engaged. As shown, second flap 130 overlaps first flap (not shown) and sixth flap 170 overlaps fifth flap (not shown), with the remaining respective flaps being respectively overlapped and magnetically engaged. Accordingly, in this exemplary embodiment, the resulting container 200 is a parallelogram; however, such a container can alternatively be provided as a cube to the extent desired by accordingly providing the shapes and/or sizes of main body 110 and flaps 120,130,140,150,160,170.

In still another exemplary aspect of the present invention, when container 200 is formed, at least one of the following can arise: first flap 120 can be planar along a first plane and second flap 130 can be planar along a second plane parallel to the first plane; third flap 140 can be planar along a third plane and fourth flap 150 can be planar along a fourth plane parallel to the third plane; and fifth flap 160 can be planar along a fifth plane and sixth flap 170 can be planar along a sixth plane parallel to the fifth plane.

Figure 3:
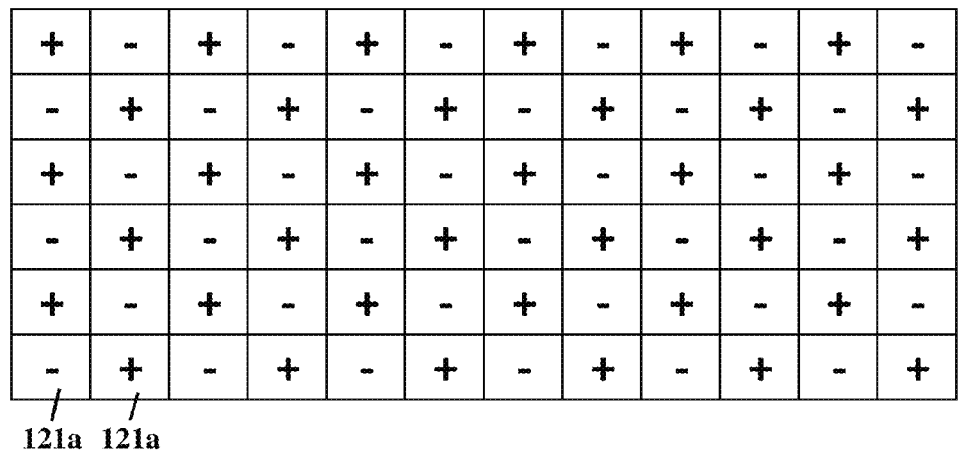
FIG. 3 illustrates an optional magnetic portion according to the present invention.

FIG. 3 illustrates an exemplary first magnetic portion 121 optionally having plural magnetic portions 121a, which as illustrated can be provided in an alternating configuration. However, such a configuration can be continuous, or follow any particular distribution desired. Notably, to the extent an associated flap is provided with another magnetic portion, the distribution therewith can be complementarily configured such that a sufficient attraction force is achieved when an engagement is sought. As also illustrated in FIG. 3, magnetic portion 121 optionally can have at least one column of multiple magnetic portions, which can be alternating, continuous, or based on any other distribution desired. Also notably, FIG. 3 is not limited to first magnetic portion 121, and as such, can be applied to any magnetic portion.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A magnetically sealable cover configured to form a hollow container having one of a cube and a parallelogram shape, said cover comprising:
   a planar main body having top, bottom, left, and right edges collectively forming four right angles, a main body length, and a main body width;
   a first flap, connected to the top edge, and having a first flap width and a first magnetic portion, the first flap width being equal to the main body width;
   a second flap, connected to the bottom edge, and having a second flap width and one of a second magnetic portion and a second ferromagnetic portion, the second flap width being equal to the main body width;
   a third flap, connected to the left edge, and having a third magnetic portion and a third flap length less than the main body length;
   a fourth flap, connected to the left edge, and having one of a fourth magnetic portion and a fourth ferromagnetic portion;
   a fifth flap, connected to the right edge, and having a fifth magnetic portion and a fifth flap length less than the main body length;
   a sixth flap, connected to the right edge, and having one of a sixth magnetic portion and a sixth ferromagnetic portion;
   wherein said main body is bent along first and second parallel lines, said first and second flaps overlap and magnetically engage, said third and fourth flaps overlap and magnetically engage, and said fifth and sixth flaps overlap and magnetically engage to form the hollow container.

2. The cover of claim 1, wherein said third and fourth flaps are spaced apart to define a gap therebetween.

3. The cover of claim 2, wherein said fifth and sixth flaps are spaced apart to define a space therebetween.

4. The cover of claim 1, wherein the first and second parallel lines have respective line lengths equal to the main body width.

5. The cover of claim 1, wherein at least one of said first, said second, said third, said fourth, said fifth, and said sixth flaps has a square shape.

6. The cover of claim 1, wherein at least one of said first, said second, said third, said fourth, said fifth, and said sixth flaps has a rectangular shape.

7. The cover of claim 1, wherein when the hollow container is formed, said first flap is planar along a first plane and said second flap is planar along a second plane parallel to the first plane.

8. The cover of claim 1, wherein when the hollow container is formed, said third flap is planar along a third plane and said fourth flap is planar along a fourth plane parallel to the third plane.

9. The cover of claim 1, wherein when the hollow container is formed, said fifth flap is planar along a fifth plane and said sixth flap is planar along a sixth plane parallel to the fifth plane.

10. The cover of claim 1, wherein when the hollow container is formed, said first flap is planar along a first plane and said second flap is planar along a second plane parallel to the first plane, said third flap is planar along a third plane, said fourth flap is planar along a fourth plane parallel to the third plane, said fifth flap is planar along a fifth plane, and said sixth flap is planar along a sixth plane parallel to the fifth plane.

* * * * *